United States Patent
Mahato et al.

(10) Patent No.: US 10,428,781 B2
(45) Date of Patent: Oct. 1, 2019

(54) VARIABLE HOLE SIZE NOZZLE AND SPRAY ANGLE FUEL INJECTOR AND MHBIB

(71) Applicant: CUMMINS INC., Columbus, IN (US)

(72) Inventors: Chandan Mahato, Columbus, IN (US); Frank Husmeier, Columbus, IN (US); Foy C. Henderson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/825,235

(22) Filed: Nov. 29, 2017

(65) Prior Publication Data
US 2018/0080422 A1    Mar. 22, 2018

Related U.S. Application Data

(62) Division of application No. 15/514,988, filed as application No. PCT/US2015/053472 on Oct. 1, 2015, now Pat. No. 9,957,939.
(Continued)

(51) Int. Cl.
| | |
|---|---|
| *F02M 61/18* | (2006.01) |
| *F02B 23/06* | (2006.01) |
| *F02M 61/10* | (2006.01) |

(52) U.S. Cl.
CPC ..... *F02M 61/1806* (2013.01); *F02B 23/0669* (2013.01); *F02M 61/18* (2013.01);
(Continued)

(58) Field of Classification Search
CPC .............. F02B 23/0651; F02B 23/0693; F02B 23/0696; F02B 23/0669; F02B 2275/14;
(Continued)

(56) References Cited

U.S. PATENT DOCUMENTS

| | | | | |
|---|---|---|---|---|
| 2,682,862 A | * | 7/1954 | Hilding | ..................... F02B 3/00 123/276 |
| 5,645,225 A | | 7/1997 | Hasegawa | |

(Continued)

FOREIGN PATENT DOCUMENTS

| | | |
|---|---|---|
| DE | 10 2006 000 418 | 3/2007 |
| EP | 1 741 924 | 1/2007 |

(Continued)

OTHER PUBLICATIONS

International Search Report and Written Opinion issued by the ISA/US, Commissioner for Patents, dated Feb. 2, 2016, for International Application No. PCT/US2015/053472; 9 pages.
(Continued)

*Primary Examiner* — Mahmoud Gimie
(74) *Attorney, Agent, or Firm* — Faegre Baker Daniels LLP

(57) ABSTRACT

A fuel injector, comprising a nozzle body having a proximal end and a distal end, an upper row of nozzle holes being equally spaced about a first circumference of the nozzle body, and a lower row of nozzle holes located between the distal end and the upper row of nozzle holes, wherein the upper row has a first number of holes that is greater than a second number of holes in the lower row and wherein one of the first number of holes and the second number of holes is odd.

14 Claims, 4 Drawing Sheets

Related U.S. Application Data

(60) Provisional application No. 62/058,958, filed on Oct. 2, 2014.

(52) U.S. Cl.
CPC .... F02M 61/1813 (2013.01); F02M 61/1826 (2013.01); F02M 61/1833 (2013.01); F02M 61/1846 (2013.01); *F02B 2275/14* (2013.01); *F02M 61/10* (2013.01); *F02M 61/182* (2013.01); *Y02T 10/125* (2013.01)

(58) Field of Classification Search
CPC ............... F02M 61/1806; F02M 61/18; F02M 61/1813; F02M 61/1826; F02M 61/1833; F02M 61/1846; F02M 61/182
USPC .............................................. 123/193.6, 279
See application file for complete search history.

(56) References Cited

U.S. PATENT DOCUMENTS

| | | | |
|---|---|---|---|
| 6,161,780 A | 12/2000 | Sugimoto et al. | |
| 6,553,960 B1 | 4/2003 | Yoshikawa et al. | |
| 6,622,693 B2 | 9/2003 | Arndt | |
| 7,377,254 B2 | 5/2008 | Hergart et al. | |
| 8,490,888 B2 | 7/2013 | Greeves et al. | |
| 8,544,770 B2 | 10/2013 | Limmer et al. | |
| 2002/0185104 A1 | 12/2002 | Arndt et al. | |
| 2003/0234006 A1 | 12/2003 | Saito | |
| 2004/0178287 A1 | 9/2004 | Okamoto | |
| 2005/0120995 A1 | 6/2005 | Tsujimoto | |
| 2005/0224606 A1 | 10/2005 | Dingle | |
| 2009/0025681 A1 | 1/2009 | Takahashi et al. | |
| 2011/0186648 A1 | 8/2011 | Greeves | |
| 2012/0085316 A1 | 4/2012 | Chen et al. | |
| 2012/0234285 A1 | 9/2012 | Venugopal et al. | |
| 2012/0305674 A1 | 12/2012 | Buehner et al. | |
| 2015/0020765 A1 | 1/2015 | Pierpont | |
| 2017/0167459 A1 | 6/2017 | Martinez | |

FOREIGN PATENT DOCUMENTS

| | | | | |
|---|---|---|---|---|
| EP | 1 961 934 | 8/2008 | | |
| EP | 2 112 348 | 10/2009 | | |
| JP | 03246317 A | * 11/1991 | .......... | F02B 23/0651 |

OTHER PUBLICATIONS

International Preliminary Report on Patentability issued by The International Bureau of WIPO, dated Apr. 4, 2017, for International Application No. PCT/US2015/053472; 6 pages.

\* cited by examiner

US 10,428,781 B2

VARIABLE HOLE SIZE NOZZLE AND SPRAY ANGLE FUEL INJECTOR AND MHBIB

CROSS-REFERENCE TO RELATED APPLICATIONS

The present application is a divisional of U.S. patent application Ser. No. 15/514,988, filed Mar. 28, 2017, and entitled "VARIABLE HOLE SIZE NOZZLE AND SPRAY ANGLE FUEL INJECTOR AND MHBIB," which claims priority to International (PCT) Patent Application Serial No. PCT/US2015/053472, filed Oct. 1, 2015, and entitled "VARIABLE HOLE SIZE NOZZLE AND SPRAY ANGLE FUEL INJECTOR AND MHBIB," which claims priority to U.S. Provisional Patent Application Ser. No. 62/058,958, filed Oct. 2, 2014, and entitled "VARIABLE HOLE SIZE NOZZLE AND SPRAY ANGLE FUEL INJECTOR AND MHBIB", the complete disclosures of which are expressly incorporated by reference herein.

TECHNICAL FIELD

The present disclosure relates generally to fuel injection nozzle and piston bowl shape configurations for use in a fuel injection system for an internal combustion engine. More specifically, the variable nozzle holes and piston bowl shape in combination or separately are configured to cause improved fuel dispersion in the combustion chamber to increase combustion efficiency and reduce emissions.

BACKGROUND

Internal combustion engines produce air pollutants due to incomplete fuel combustion. The derivatives of incomplete combustion are carbon dioxide, water, and smoke, also known as particulate matter. These emissions are strictly regulated by the government. The emission of byproducts of the combustion process depends in part on the fuel-air mixture in the combustion chamber. One inefficient way, currently known, to reduce the emission of particulate matter is by increasing the amount of air used during the combustion process. However, such increase results in increased production of nitrogen oxides (NOx), which is also strictly regulated. To reduce the production of NOx, a higher level of exhaust gas recirculation (EGR) is used but unfortunately such use results in producing increased amounts of particulate matter. Other methods, like late injection timing, and high injection pressure can be used to reduce emissions of both NOx and particulate matter, but these have a high initial cost.

The internal combustion engine usually can be divided into two engine operation conditions namely: the low engine load condition and the high engine load condition. In the low load condition, emission of particulate matter is very challenging to control. However, it still has to meet strict governmental regulations. During low engine load operation, the air density in the combustion chambers is very low which offers little resistance to spray penetration of fuel from the fuel injectors. Therefore, with the current known technology, it is difficult to comply with the emissions regulations.

The nozzle of a direct injection fuel injector may have multiple holes to disperse the fuel quantity into the combustion chamber. The diameter and spray angle of the nozzle holes also have a very strong effect on combustion characteristics. Generally, all spray holes have same diameter and angle. Therefore such fuel injectors have uniform spray penetration. Large diameter nozzle holes present significant challenges in meeting emissions regulations under low engine load conditions. Due to uniform spray penetration either there is an insufficient amount of energy in the fuel spray or insufficient in-cylinder air motion to properly mix the air and fuel as needed for efficient combustion. These insufficiencies often lead to incomplete combustion and consequently, emission of higher quantities of particulate matter.

Thus, there remains a need in the art for apparatuses, methods, and systems of various nozzle holes and piston bowl shapes that when used together or separately produce less particulate matter and permit the engine to meet emissions regulations without sacrificing the performance of after treatment systems and service life.

SUMMARY

In one embodiment, the present disclosure provides a fuel injector, comprising a nozzle body having a proximal end and a distal end, an upper row of nozzle holes being equally spaced about a first circumference of the nozzle body, and a lower row of nozzle holes located between the distal end and the upper row of nozzle holes, wherein the upper row has a first number of holes that is greater than a second number of holes in the lower row and wherein one of the first number of holes and the second number of holes is odd. According to one aspect of this embodiment, the nozzle holes of the upper row each have a first diameter and the nozzle holes of the lower row each have a second diameter, the first diameter having a ratio to the second diameter in the range of 3.2:1 to 1.5:1. In another aspect of this embodiment, the nozzle holes of the upper row each have a first angle relative to a horizontal axis of the nozzle body and the nozzle holes of the lower row each have a second angle relative to the horizontal axis, the first angle having a ratio to the second angle in the range of 0.5:1 to 1.5:1. In yet another aspect of this embodiment, the nozzle holes of the upper row are configured to provide a plume of fuel that corresponds to a shape of a piston bowl. Another aspect of this embodiment, further including a nozzle hole at a bottom center of the nozzle body. In another aspect of this embodiment, each nozzle hole includes an inlet having an inlet diameter, an outlet having an outlet diameter, and a passage extending between the inlet and the outlet through the nozzle body, the inlet diameter being different from the outlet diameter.

In another embodiment of the present disclosure, a piston is provided comprising a piston crown extending along a circumference of the piston and defining a top surface of the piston, the piston crown defining a volume configured to receive fuel, a first piston bowl located radially inward of the piston crown, the first piston bowl having a bottom surface and a greatest diameter at an interface between an outer annular wall of the first piston bowl and the top surface of the piston, a second piston bowl located radially inward of the bottom surface of the first piston bowl and having an upper edge located below the top surface of the piston, a third piston bowl located radially inward of the second piston bowl and having an upper edge located below the top surface of the piston, and a frustoconical portion located radially inward of a bottom of the third piston bowl and having an upper surface located below the top surface of the piston. Another aspect of this embodiment, further including a frustoconical outer floor portion joining an inner wall of the second piston bowl and an outer wall of the third piston bowl forming an inlet lip. In another aspect of this embodiment, the first, the second and the third piston bowls each include annular concave portions. In yet another aspect of this embodiment, a fuel injection nozzle is configured to provide a plume of fuel that corresponds to a shape of the piston. According to yet another aspect, the piston crown has an inner lower surface that matches a bottom surface of the piston crown.

In another embodiment, a combustion system is provided comprising a combustion chamber, a fuel injection nozzle disposed in flow communication with the combustion chamber, the fuel injection nozzle including an upper row of nozzle holes, each having a first spray angle relative to a central axis of the fuel injection nozzle and a first diameter, and a lower row of nozzle holes, each having a second spray angle relative to the central axis of the fuel injection nozzle, and a second diameter, and a piston disposed in the combustion chamber having a central axis that is coaxial with the central axis of the fuel injection nozzle and a piston crown at a top surface of the piston, wherein the piston crown defines a volume configured to receive fuel, the piston including a first piston bowl located radially inward of the piston crown, the first piston bowl having a bottom surface and a greatest diameter at an interface between an outer annular wall of the first piston bowl and the top surface of the piston, a second piston bowl located radially inward of the bottom surface of the first piston bowl and having an upper edge located below the top surface of the piston, a third piston bowl located radially inward of the second piston bowl and having an upper edge located below the top surface of the piston, and a frustoconical portion located radially inward of a bottom of the third piston bowl and having an upper edge located below the top surface of the piston. According to one aspect of this embodiment, the fuel injection nozzle includes a fuel injection nozzle hole centered on the central axis of the fuel injection nozzle at an end of the fuel injection nozzle. According to yet another aspect of this embodiment, the first diameter of the upper row of nozzle holes has a ratio to the second diameter of the lower row of nozzle holes in a range of 3.2:1 to 1.5:1. In another aspect of this embodiment, the first angle of the upper row of nozzle holes has a ratio to the second angle of the lower row of nozzle holes in a range of 0.5:1 to 1.5:1. In yet another aspect of this embodiment, the upper row of nozzle holes are positioned on the nozzle to inject fuel in a manner that impinges upon an annular outer wall of the second piston bowl. According to another aspect of this embodiment, the lower row of nozzle holes are positioned on the nozzle to inject fuel in a manner that impinges upon the third piston bowl.

In yet another embodiment of the present disclosure, a piston is provided comprising a piston crown extending along a circumference of the piston and defining a top surface of the piston, wherein the piston crown defines a volume configured to receive fuel, a frustoconical portion located at a center of the piston, the frustoconical portion having an upper surface located below the top surface of the piston, a first concave portion extending radially outward from the frustoconical portion, the first concave portion having a first radius with a center located at a first distance from the top surface of the piston, a frustoconical outer floor portion extending radially outward from the first concave portion, a second concave portion extending radially outward from the frustoconical outer floor portion, the second concave portion having a second radius with a center located at a second distance from the top surface of the piston, wherein the second radius of the second concave portion is greater than the first radius of the first concave portion, and the second distance is greater than the first distance, a first convex portion extending radially outward from the second concave portion, the first convex portion having a third radius with a center located at a third distance from the top surface of the piston, wherein the third distance is less than the second distance, and a third concave portion extending radially outward from the first convex portion, the third concave portion having a fourth radius with a center located at a fourth distance from the top surface of the piston, wherein the fourth distance is less than the first distance. In one aspect of this embodiment, further including a curved protrusion forming an inlet lip at an intersection of an outer surface of the first concave portion and the frustoconical outer floor portion.

In one embodiment a method is provided comprising injecting a plume of fuel into a combustion chamber toward an outer bowl of a piston, and impinging the plume of fuel onto an inlet lip formed between the outer bowl and an inner bowl of the piston, wherein the inlet lip redirects the fuel upon impact to provide turbulence and additional fuel-air mixing in a central region of the piston. In another aspect of this embodiment, the outer piston bowl is configured to redirect injected fuel radially inward and upwards towards a piston crown.

In yet another embodiment of present disclosure, a method is provided comprising operating a fuel injector in response to a low engine load condition such that a first fuel injection event occurs in which the fuel is injected through a lower row of holes formed in a nozzle of the injector, and operating the fuel injector in response to a high engine load condition such that a second fuel injection event occurs in which fuel is injected through the lower row of holes and through an upper row of holes formed in the nozzle wherein the fuel injected in the first fuel injection event maintains a predetermined air-fuel ratio in a central region of a piston. In another aspect of this embodiment, wherein operating the fuel injector in response to a low engine load condition includes directing at least a portion of the fuel through the lower row of holes at a first angle relative to a plane containing a top surface of the piston, and operating the fuel injector in response to a high engine load condition includes directing at least the portion of the fuel through the upper row of holes at a second angle relative to the plane, the first angle being larger than the second angle.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
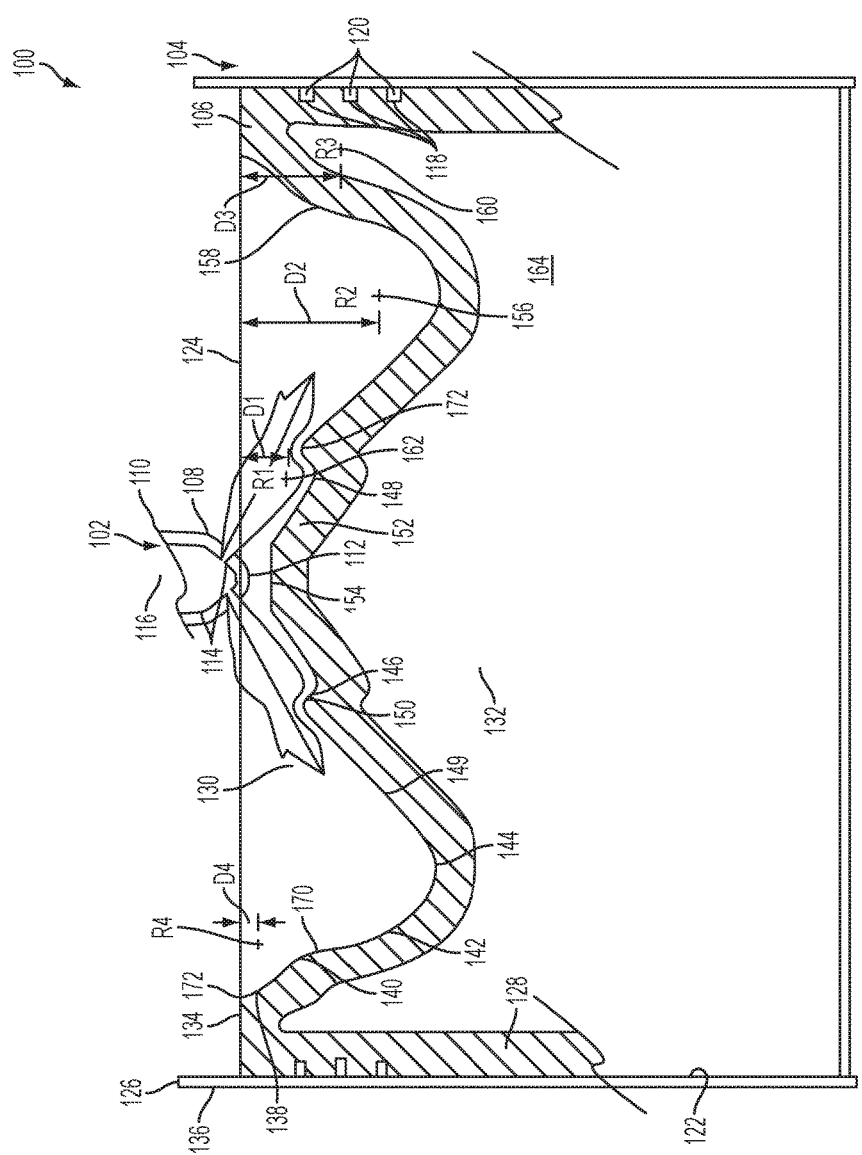
FIG. 1 is a sectional, side view showing a combustion system with a first piston embodiment according to present disclosure.

Although the drawings represent embodiments of the various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION OF EMBODIMENTS

For the purpose of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated device and described methods and further applications of the principles of the disclosure, which would normally occur to one skilled in the art to which the disclosure relates. Moreover, the embodiments were selected for description to enable one of ordinary skill in the art to practice the disclosure.

Referring now to FIG. 1, a combustion system 100 according to one embodiment of the present disclosure is depicted as including a fuel injector 102 (not fully shown), a cylinder 104, and a piston 106. Fuel injector 102 includes a nozzle body 108, a proximal end 110, and a distal end 112. In this embodiment fuel injector 102 includes a single row of holes 114 between proximal end 110 and distal end 112 of the nozzle body 108. Holes 114 are located on the nozzle body 108. Holes 114 may have different diameters or the same diameter. Each hole 114 has a spray angle relative to a plane perpendicular to a central axis 116 of the nozzle body 108. Holes 114 may have different spray angles or the same spray angle. Holes 114 are arranged at a regular interval about a circumference of the nozzle body 108.

Cylinder 104 generally includes a cylinder cavity 122, and piston 106. Cylinder 104 is generally formed in an engine block (not shown). A cylinder head (not shown) is positioned on a top surface 126 of cylinder 104. The bottom surface of the cylinder head attaches to engine bock closing cylinder 104 from its top surface 126 and forming a combustion chamber 136. Piston 106 is slidably disposed within the cylinder 104. The cylinder head includes an exhaust passage (not shown), an intake passage (not shown) and an injector bore (not shown). Fuel injector 102 is securely mounted into the injector bore formed within the cylinder head for injecting fuel in combustion chamber 136. The exhaust passage formed in the cylinder head directs exhaust gases from combustion chamber 136 and an intake passage directs intake air into combustion chamber 136.

The piston 106 generally includes a depending cylindrical wall 128, a top surface 134, a piston crown 130, and a lower surface 132. Central axis 116 of fuel injector 102 is also a central axis of piston 106. Top surface 134 of piston 106 corporates with the cylinder head and a portion of cylinder 104 that extends between the cylinder head and piston 106 to define combustion chamber 136. Cylindrical wall 128 includes a plurality of annular groves 118 for receiving corresponding piston rings 120 designed to form a relatively light combustion gas seal between piston 106 and cylinder 104. Although not specifically shown in FIG. 1, piston 106 is connected to a crankshaft by way of a connecting rod that causes piston 106 to reciprocate along a rectilinear path within cylinder 106 as the crankshaft rotates in a manner that is well known in the art.

Still referring to FIG. 1, an upper portion of piston 106 is referred to as piston crown 130. Piston crown 130 is configured to receive fuel from fuel injector 102. Piston crown 130 further includes a top face partially forming combustion chamber 136 and an outer bowl or first piston bowl 138 formed by an outwardly opening cavity. First piston bowl 138 has a bottom surface 140 and a greatest diameter at an interface between top surface 134 of piston 106 and an annular inner wall of first piston bowl 138. A main or second piston bowl 142 is centrally located within first piston bowl 138 such that an upper edge 170 of second piston bowl 142 is lower than top surface 134 of piston 106. A third piston bowl 146 is radially located within second piston bowl 142. Similar to second piston bowl 142, an upper edge 172 of third piston bowl 146 is lower than top surface 134 of piston 106. A frustoconical portion 152 is located within third piston bowl 146. A frustoconical outer floor portion 149 joins an outer wall of third piston bowl 146 and an inner wall of second piston bowl 142 to form an annular spray targeting lip or inlet lip 150.

First piston bowl 138 forms a concave portion having a radius R4. Radius R4 has a center 164 located at a distance D4 from a plane 124 including top surface 134 of piston 106. Similarly, second piston bowl 142 forms an annular concave portion with a radius R2. Radius R2 has a center 156 located at distance D2 from plane 124. A convex portion 158 is formed between first piston bowl 138 and second piston bowl 142 and has a radius R3. Radius R3 has a center 160 located at a distance D3 from plane 124. Third piston bowl 146 forms an annular concave portion that has a radius R1 with a center 162 located at a distance D1 from plane 124.

Various features described hereinabove are positioned in certain relationship to one another as described below. Bottom surface 144 of second piston bowl 142 is lower (relative to plane 124) than bottom surface 140 of first piston bowl 138. Additionally, bottom surface 148 of third piston bowl 146 is higher than bottom surface 144 of second piston bowl 142. Furthermore, the greatest diameter of second piston bowl 142 is smaller than the greatest diameter of first piston bowl 138 and the greatest diameter of third piston bowl 146 is smaller than the greatest diameter of second piston bowl 142. Lastly, upper surface 154 of frustoconical portion 152 is lower than top surface 134 of piston 106.

In radial distance from central axis 116 of piston 106, center 156 of radius R2 is positioned between central axis 116 of piston 106 and center 160 of radius R3. Center 162 of radius R1 is positioned between central axis 116 of piston 106 and center 156 of radius R2. Center 164 of radius R4 is positioned between center 156 of radius R2 and center 160 of radius R3. With respect to axial distances, distance D2 is greater than D1 which in turn is greater than D4 (D2>D1>D4). Also, distance D2 is greater than D3. Additionally, with respect to various radiuses of concave and convex portions described hereinabove, radius R1 is smaller than radius R2 (R1<R2).

Continuing with FIG. 1, fuel injected from holes 114 enters combustion chamber 136 at different angles or the same angle forming a nominal cone along the fuel spray line of sight. As fuel exits holes 114 it breaks up after reaching a critical liquid length depending upon flow conditions and ambient conditions, for example, fuel viscosity. Upon breakup, sprayed fuel takes up a nominal conical shape (as shown in FIG. 1) with a certain cone angle. A bulk portion of sprayed fuel hits second piston bowl 142 but a small portion is sheared off by inlet lip 150, and is redirected towards third piston bowl 146 creating a flow motion as shown in FIG. 1. This redirected fuel mixes with unused air at the center of combustion chamber 136 thereby adding turbulence for improved combustion.

Figure 2:
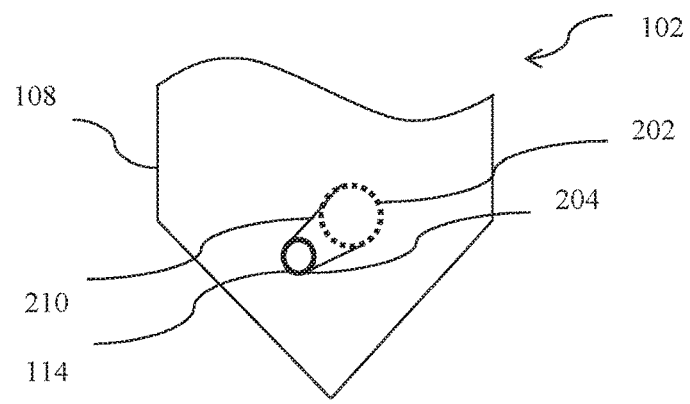
FIG. 2 is an enlarged view of a nozzle hole of the fuel injector of FIG. 1.

Referring now to FIG. 2, an enlarged view of one of the holes 114 is depicted. Holes 114 or bores include an inlet 202, an on outlet 204, and a passage 210. Passage 210 extends between inlet 202 and outlet 204 through the nozzle body 108. A high pressurized fuel flows from the inlet 202 to the outlet 204 via passage 201. Inlet 202 has a diameter which is different than a diameter of outlet 204. In this example, the inlet diameter is larger than the outlet diameter. Furthermore, inlet 202 has curved edges configured to reduce turbulence that causes cavitation. It should be understood from above description that any combination of inlet 202 diameters and outlet 204 diameters may be included in an embodiment of present disclosure.

Figure 3:
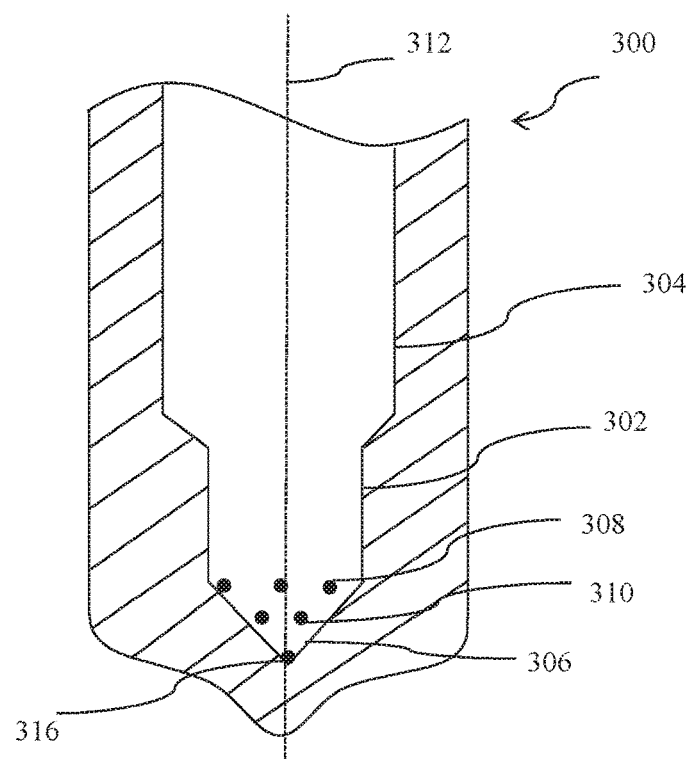
FIG. 3 is a sectional, side view showing a fuel injector.

Referring now to FIG. 3, a fuel injector 300 (not fully shown) is depicted having multiple rows of nozzle holes. Fuel injector 300 includes a nozzle body 302, a proximal end 304, a distal end 306, an upper row of nozzle holes 308, a lower row of nozzle holes 310, and a central axis 312. Upper row of nozzle holes 308 is positioned between proximal end 304 and distal end 306 of nozzle body 302, for permitting a spray plume emanating from the upper row of nozzle holes 308 to form a general conical shape, and mix with high temperature air in a main piston bowl in a combustion chamber (such as second piston bowl 142 of FIG. 1). Lower row of nozzle holes 310 is positioned between upper row of nozzle holes 308 and distal end 306 of the nozzle body 302, for permitting high pressure fuel to flow into a combustion chamber at a high pressure to induce thorough mixing of fuel with high temperature, compressed air in a central region of combustion chamber.

Each hole of upper row 308 includes a first diameter and a first spray angle or a main fuel spray angle relative to a plane horizontal to central axis 312. Similarly, each hole of lower row 310 includes a second diameter and a second spray angle relative to a plane horizontal to central axis 312. Each hole of upper row 308 is placed at equidistance from one another about an upper row circumference. Furthermore, the total number of holes in each of the upper row 308 and lower row 310 is always different such that if total number of holes in upper row of nozzle holes 308 is an even number then the total number of holes in lower row of nozzle holes 310 is an odd number. Additionally, if total number of holes in the upper row of nozzle holes 308 is an odd number then the total number of holes in lower row of nozzle holes 310 may be an even number or an odd number.

In one embodiment of the present disclosure, a ratio between the first diameter of the upper row of holes 308 and the second diameter of the lower row of holes 310 is within a range of 3.2:1 to 1.5:1. Furthermore, a ratio between the first spray angle of the upper row of holes 308 and the second spray angle of the lower row of holes 310 is within a range of 0.5:1 to 1.5:1. Depending upon the implementation of the present disclosure, the ratio between the first diameter of the upper row of holes 308 and the second diameter of the lower row of holes 310 may be higher or lower. Similarly, the ratio between the first spray angle of the upper row of the holes 308 and the second spray angle of the lower row of holes 310 may be higher or lower based upon the implementation of the present disclosure.

Another embodiment of the present disclosure includes a hole 316 at a bottom center of distal end 306 of nozzle body 302. The diameter and spray angle of bottom center hole 316 is the same or different than the first diameter and first spray angle of upper row 308, and the second diameter and second spray angle of lower row 310. As explained above, the total number of holes in each of upper row 308 and lower row 310 are always different such that at least one of total number of holes in upper row 308 or lower row 310 is always odd. Furthermore, it should be understood from the above description that FIG. 2 is intended to depict a hole from any one of upper row of holes 308, lower row of holes 310, and bottom center hole 316 of the nozzle body 302.

Figure 3A:
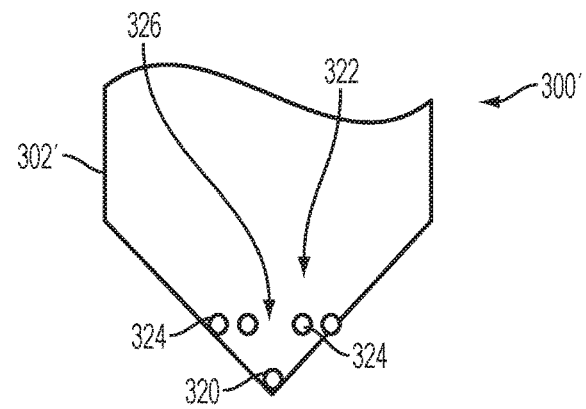
FIG. 3A is a sectional, side view of an alternative embodiment fuel injector.
Figure 3B:
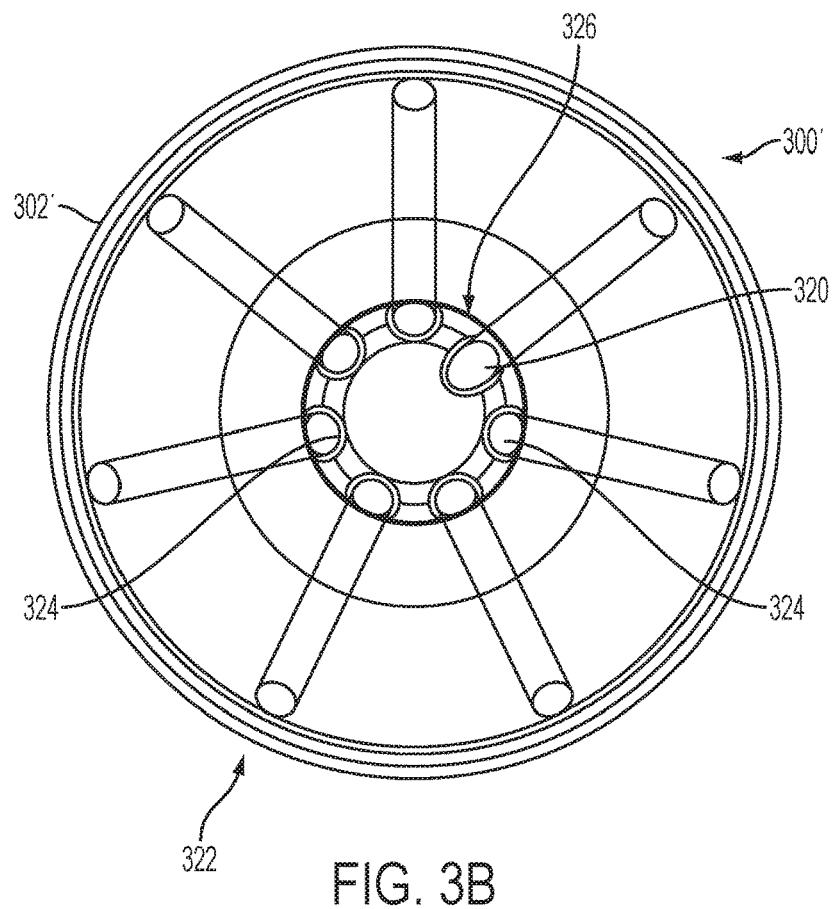
FIG. 3B is a bottom view of the alternative embodiment fuel injector of FIG. 3.
Figure 4A:
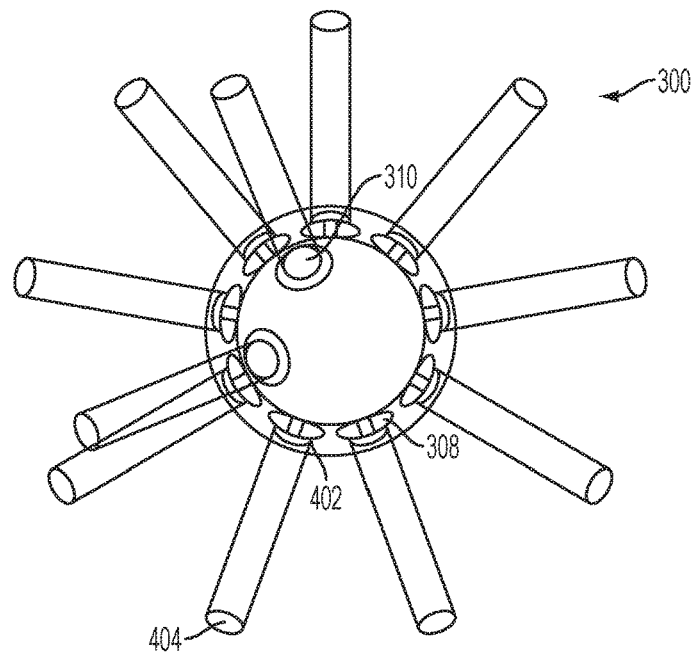
FIG. 4A is a sectional, bottom view of the fuel injector of FIG. 3.
Figure 4B:
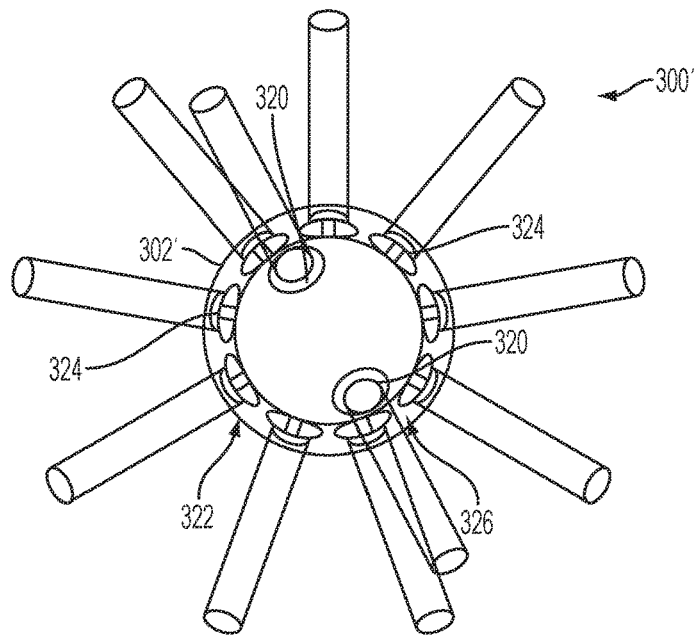
FIG. 4B is a sectional, bottom view of the fuel injector of FIGS. 3A and 3B.

As shown in FIGS. 3A, 3B, and 4B, an alternative embodiment fuel injector 300' includes a nozzle body 302' with at least one hole 320 defining a lower "row" and an upper row 322 of nozzle holes 324 positioned longitudinally above hole 320. The diameter and spray angle of hole(s) 320 is the same or different than the diameter and spray angle of holes 322. The total number of nozzle holes of fuel injector 300' is defined by the sum of the number of nozzle holes 324 in upper row 322 plus hole(s) 320. For example, upper row 322 includes one less nozzle hole than the total number of nozzle holes of fuel injector 300', with the final one nozzle hole defined by hole 320. In one embodiment, the total number of nozzle holes of fuel injector 300' may be 5-12 total nozzle holes and, for example, if fuel injector 300' includes a total of 7 nozzle holes, then upper row 322 includes 6 nozzle holes 324 and the lower "row" includes hole 320 for a total of 7 nozzle holes. Similarly, if fuel injector 300' includes a total of 10 nozzle holes, then upper row 322 includes 9 nozzle holes 324 and the lower "row" includes hole 320 for a total of 10 nozzle holes.

Hole(s) 320 may be radially and/or axially offset from the bottom center of distal end 306 of nozzle body 302' and any of holes 322. As shown in FIGS. 3B and 4B, collectively, hole(s) 320 and holes 324 are evenly distributed about the circumference of nozzle body 302', however, hole(s) 320 is positioned longitudinally below holes 324. Holes 324 are evenly distributed about the circumference of nozzle body 302 at the longitudinal position of upper row 322 as if upper row 322 includes the total number of nozzle holes of fuel injector 300'. However, because upper row 322 includes, for example, one less than the total number of nozzle holes, there is at least one gap 326 in nozzle body 302'. Gap(s) 326 corresponds to the position of the final nozzle hole(s) of fuel injector 300', i.e., hole(s) 320, which is positioned longitudinally below gap(s) 326. In this way, hole(s) 320 is longitudinally offset from the bottom center of distal end 306 of fuel injector 300' and is positioned longitudinally below gap 326 rather than below any of holes 322.

By defining hole(s) 320 as the single nozzle hole at distal end 306 of nozzle body 302', fuel flowing along a needle (not shown) of nozzle body 302' first flows into hole(s) 320 before flowing through holes 322. In this way, fuel initially flows from hole 320 which initiates combustion by flowing a small amount of fuel into cylinder 104 (FIG. 1). The fuel flowing through holes 324 subsequently flows into cylinder 104 to increase combustion therein. As such, the fuel flowing initially through hole(s) 320 provides a pre-combustion quantity of fuel to cylinder 104 to initiate combustion therein which results in more complete combustion when the fuel flowing through nozzles 324 of upper row 322 flows into cylinder 104.

Referring now to FIG. 4A, an exemplary embodiment of fuel injector 300 of the present disclosure is shown. Fuel injector 300 includes 7 holes in upper row 308 and two holes in lower row 310. As shown, inlet 402 diameter of each hole of upper row 308 and lower row 310 is greater than the outlet 404 diameter. It should be understood from the present disclosure that in some embodiments upper row of holes 308 may have inlet 402 diameter greater than the outlet 404 diameter and in same embodiment lower row of holes 310 may have inlet 402 diameter smaller than the outlet 404 diameter and vice versa.

Fuel injector 300 as illustrated in FIG. 4A operates in two events, namely: a first fuel injection event and a second fuel injection event. In both events, fuel injector 300 injects a plume of fuel into a combustion chamber (such as chamber 136 of FIG. 1); however, fuel is injected from either lower row of holes 308 or upper row of holes 310 or in some cases both. Upper row of holes 308 is configured such that most of the fuel is directed toward a main piston bowl (such as second piston bowl 142 of FIG. 1). It should be understood from the present disclosure that various kinds of piston bowl shapes may be used in combination with fuel injector 300. Lower row of nozzle holes 310 is configured such that fuel injected from it reaches a central region of piston 106. As illustrated above upper row of holes 308 sprays fuel at a different angle than lower row of holes 310. As piston 106 moves toward the top dead center position during a compression stroke, fuel is injected into combustion chamber 136 from fuel injector 300. Under low engine load conditions, a majority of fuel is injected though lower row of holes 310 and mixes with unused air in a center region of piston 106. Under high engine load conditions, fuel is injected through the lower row of holes 310 as well as upper row of holes 308.

While the embodiments have been described as having exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A piston, comprising;
   a piston crown extending along a circumference of the piston and defining a top surface of the piston, the piston crown defining a volume configured to receive fuel;
   a first piston bowl located radially inward of the piston crown, the first piston bowl having a bottom surface and a greatest diameter at an interface between an outer annular wall of the first piston bowl and the top surface of the piston;
   a second piston bowl located radially inward of the bottom surface of the first piston bowl and having an upper edge located below the top surface of the piston;
   a third piston bowl located radially inward of the second piston bowl and having an upper edge located below the top surface of the piston; and
   a frustoconical portion located radially inward of a bottom of the third piston bowl and having an upper surface located below the top surface of the piston.

2. The piston of claim 1, further including a frustoconical outer floor portion joining an inner wall of the second piston bowl and an outer wall of the third piston bowl forming an inlet lip.

3. The piston of claim 1, wherein the first, the second and the third piston bowls each include annular concave portions.

4. The piston of claim 1, wherein a fuel injection nozzle is configured to provide a plume of fuel that corresponds to a shape of the piston.

5. The piston of claim 1, wherein the piston crown has an inner lower surface that matches a bottom surface of the piston crown.

6. The piston of claim 1, further comprising a curved surface defined between the second and third piston bowls.

7. The piston of claim 6, wherein the curved surface defines a curved protrusion.

8. A combustion system, comprising;
   a combustion chamber;
   a fuel injection nozzle disposed in flow communication with the combustion chamber, the fuel injection nozzle including an upper row of nozzle holes, each having a first spray angle relative to a central axis of the fuel injection nozzle and a first diameter, and a lower row of nozzle holes, each having a second spray angle relative to the central axis of the fuel injection nozzle, and a second diameter; and
   a piston disposed in the combustion chamber having a central axis that is coaxial with the central axis of the fuel injection nozzle and a piston crown at a top surface of the piston, wherein the piston crown defines a volume configured to receive fuel, the piston including a first piston bowl located radially inward of the piston crown, the first piston bowl having a bottom surface and a greatest diameter at an interface between an outer annular wall of the first piston bowl and the top surface of the piston, a second piston bowl located radially inward of the bottom surface of the first piston bowl and having an upper edge located below the top surface of the piston, a third piston bowl located radially inward of the second piston bowl and having an upper edge located below the top surface of the piston, and a frustoconical portion located radially inward of a bottom of the third piston bowl and having an upper edge located below the top surface of the piston.

9. The combustion system of claim 8, wherein the fuel injection nozzle includes a fuel injection nozzle hole centered on the central axis of the fuel injection nozzle at an end of the fuel injection nozzle.

10. The combustion system of claim 8, wherein the first diameter of the upper row of nozzle holes has a ratio to the second diameter of the lower row of nozzle holes in a range of 3.2:1 to 1.5:1.

11. The combustion system of claim 8, wherein the first angle of the upper row of nozzle holes has a ratio to the second angle of the lower row of nozzle holes in a range of 0.5:1 to 1.5:1.

12. The combustion system of claim 8, wherein the upper row of nozzle holes are positioned on the nozzle to inject fuel in a manner that impinges upon an annular outer wall of the second piston bowl.

13. The combustion system of claim 8, wherein the lower row of nozzle holes are positioned on the nozzle to inject fuel in a manner that impinges upon the third piston bowl.

14. A piston, comprising:
   a piston crown extending along a circumference of the piston and defining a top surface of the piston, wherein the piston crown defines a volume configured to receive fuel;
   a frustoconical portion located at a center of the piston, the frustoconical portion having an upper surface located below the top surface of the piston;
   a first concave portion extending radially outward from the frustoconical portion, the first concave portion having a first radius with a center located at a first distance from the top surface of the piston;

a frustoconical outer floor portion extending radially outward from the first concave portion;

a second concave portion extending radially outward from the frustoconical outer floor portion, the second concave portion having a second radius with a center located at a second distance from the top surface of the piston, wherein the second radius of the second concave portion is greater than the first radius of the first concave portion, and the second distance is greater than the first distance;

a first convex portion extending radially outward from the second concave portion, the first convex portion having a third radius with a center located at a third distance from the top surface of the piston, wherein the third distance is less than the second distance;

a third concave portion extending radially outward from the first convex portion, the third concave portion having a fourth radius with a center located at a fourth distance from the top surface of the piston, wherein the fourth distance is less than the first distance; and a curved protrusion forming an inlet lip at an intersection of an outer surface of the first concave portion and the frustoconical outer floor portion.

\* \* \* \* \*